United States Patent Office 3,285,943
Patented Nov. 15, 1966

3,285,943
PROCESS FOR THE REMOVAL OF IMPURITIES FROM ACTINIDES
Kåre P. Lindland, Kjeller, near Lillestrom, Norway, assignor to Institutt for Atomenergi, Kjeller, near Lillestrom, Norway
No Drawing. Filed May 3, 1963, Ser. No. 277,703
Claims priority, application Norway, May 8, 1962, 144,294/62
9 Claims. (Cl. 260—429.1)

The present invention relates to the purification of actinides by utilising the difference in molecular size obtained by selective complex formation. In particular, it is an object of the invention to remove fission products from irradiated nuclear reactor fuel.

The preparation of nuclear fuel from uranium concentrate, as well as treatment of irradiated reactor fuel, usually include a purification step comprising liquid-liquid extraction from an acid solution by an organic solvent.

Exceptionally high requirements are demanded of the purity of reactor fuel. Such requirements are not always satisfied by liquid-liquid extraction. In particular, certain fission products are difficult to remove from the actinides in irradiated reactor fuel.

In order to obtain better results, it has been suggested, for instance in the U.S. patent specification No. 2,796,424, that such fission products which have not been removed from the actinides by liquid-liquid extraction are removed upon re-extraction to aqueous phase, by addition of an organic solvent which forms complexes with the fission products, whereupon these products are removed by adsorption on silica gel.

It has also been suggested, for instance in the U.S. patent specification No. 2,717,696, to remove by adsorption those fission products which have accompanied the actinides into the organic phase during the liquid-liquid extraction.

It is the object of the process according to the invention, to avoid the use of the liquid-liquid extraction, and in one single step remove fission products or impurities originating from an uranium concentrate.

This is achieved by the admixture to an acid solution of actinides, of a complexing agent which converts the actinides into water soluble complexes having a great molecular diameter, leaving the fission products or other impurities in uncomplexed form. Thereupon, the impurities are removed by utilising the resulting difference in molecular size between the complexed actinides and uncomplexed impurities. According to the invention, this may, by way of example, be performed by molecular filtration or electrodialysis.

In this patent specification the term molecular filtration is defined as that porous filtration which takes place when a fluid is passed through a micro-porous substance having so narrow pores that molecules of relatively great diameter are passed unhindered, while molecules having relatively small diameter are retained in the pores. In this patent specification such micro-porous substances are referred to as molecular sieves.

Among the advantages of the process according to the invention, it may be referred to the fact that actinides of high purity are obtained.

As a further advantage, it may be mentioned that it is not necessary to transfer the actinides, which constitute the essential part of the dissolved substance, to an organic phase and return it to the water phase.

Of further advantages, it may be mentioned that it is possible to solidify the fission products directly by use of molecular sieves. In such state the fission products may readily be stored. In this way an expensive pre-treatment of the fission product solution is avoided. Such treatment is otherwise required in connection with liquid-liquid extraction processes and may consist in concentrating the solution by evaporation with subsequent storage of a highly radioactive and nitric acid containing corrosive solution or, neutralising the concentrated solution thereby necessitating greater amounts of chemicals and increased storage capacity. It is also possible, for instance by means of chromatography, to purify the individual fission products for industrial application. Further, it is possible to convert molecular sieves containing the fission products into glass or similar materials for permanent storage.

A further important advantage is that the column height required in order to obtain a certain degree of separation, is much smaller for molecular sieve columns than for extraction columns. Thus, it is commonly assumed that the separation capacity of a certain column height is about 100 times greater in solid-liquid-chromatographic columns than in pulsating extraction columns.

Molecular sieves capable of separating or filtering molecules according to the molecuar size have recently been marketed. Such molecular sieves may, by way of example, be made of synthetic aluminum silicates or synthetic polysaccharides and are granular substances having pores of such small dimensions that relatively large molecules are prevented from entering the pores.

In the following description, the process of the invention is exemplified by reference to the purification of uranium and plutonium, without thereby introducing any restriction of the utilisation possibilities of the process.

It is known that the actinides have a characteristic ability to form stable, coordinative complexes with donor groups such as $O=$ and $N\equiv$. This fact is utilised in recuperation processes based on liquid-liquid extraction, such as for instance the Purex or Redox processes. In the Purex process, uranium and plutonium are complexed with tributyl phosphate and in the Redox process with methyl isobutyl ketone. Such compounds form coordinative bonds with uranium and plutonium at the polar oxygen atom. Thereby, uranium and plutonium are surrounded by organic molecule groups making the complexes soluble in organic liquids. The fission products, on the other hand, form practically no stable complexes with the complexing agents mentioned. Consequently, uranium and plutonium may be separated from the fission products by extraction with organic solvents which are admixed with a certain amount of suitable complexing agents, such as alcohols, ethers, esters, ketones and certain amines.

Due to their high positive central charge, the actinides have a distinct tendency to form complexes with anions such as $NO_3^-$ or $F^-$. Consequently, the uranium and plutonium easily form complexes wherein both electrovalency and coordinative valency are fully saturated. Thus, by the addition of tributyl phosphate to a nitric acid solution of uranium and plutonium, complexes of the following type are obtained:

$$U^{VI}O_2(NO_3)_2 \cdot 2TBP \text{ and } Pu^{IV}(NO_3)_4 \cdot 2TBP$$

wherein TBP stands for tributyl phosphate.

In the process according to the invention, the same characteristics of plutonium and uranium are utilised, but the complexes formed are now to be water soluble. This may be achieved by the introduction of polar atom groups in the complexing agent. Such atom groups may be of the hydroxy, ether, ester, keto and carboxy types etc. Suitable complexing agents for the present purposes may be:

Diol compounds such as:
Ethylene glycol of D=14 A.
1,3 propane diol of D=16.5 A.
1,4 butane diol of D=21.5 A.

or triol compounds such as 1, 2, 6-hexane triol of D=24 A. or polyethylene glycols of the $$HOCH_2(CH_2OCH_2)_n \cdot CH_2OH$$

Herein D denotes the molecular diameter of the uranium and plutonium complex expressed in Angstrom units, i.e. the diameter of the smallest sphere shell which can circumscribe the molecule. Other suitable compounds may be ketone derivatives of the type $$O=C\begin{smallmatrix}R_1\\R_2\end{smallmatrix}$$

wherein $R_1$ and $R_2$ are oxygenated hydrocarbon chains.

Nitrogenous derivatives may also be used. As examples of such derivatives, reference may be made to derivatives of hydroxylamine, carbamide, triethanolamine or nitrilotriacetic acid.

In a uranyl nitrate solution upon complexing, uranium and plutonium form complexes of the type $$UO_2(NO_3)_n \cdot L_m \text{ and } Pu(NO_3)_p \cdot L_q$$

wherein:

L is the organic ligand,
$n$ is an integer between 0 and 2,
$m$ is an integer between 0 and 2,
$p$ is an integer between 0 and 4, and
$q$ is an integer between 0 and 2.

When $n=m=2$, or $p=4$ and $q=2$, the complexes are neutral with the stable coordination number 6. Such complexes have a critical diameter of between 15 and 25 A., dependent upon the molecular size of the ligands.

The term critical diameter is here meant to express the diameter of the smallet sphere shell which can circumscribe the molecule.

The fission products are uncomplexed and are charged ions of atom numbers between 30 and 64, and of an ion diameter between 1.4 and 2 A.

If a molecular sieve is used to separate the fission products from the actinides it is, according to the invention, preferable to use an acid resistant substance of a pore diameter which is half the dimension of the complexed actinides, but 3 to 4 times the ion diameter of the fission products. In other words, the pore diameter should be between 6 and 12 A., provided that the complexed actinide moleclues are of a critical diameter of between 20 and 24 A.

According to the invention, silica gel is particularly well suited as a molecular sieve. A suitable silica gel may, by way of example, be prepared by slow polymerisation of orthosilicic acid at pH=2. A silica gel of a specific pore volume of 0.5 ml./gms. of $SiO_2$ will have a sorbtion capacity of approximately 0.4 gms. of fission products per gram of silica gel, if the pores are 50% charged. At a burnup of 1000 megawatt days/ton U, this corresponds to a purification capacity of about 500 gms. of U/gm. of $SiO_2$.

The molecular sieve is formed as a column charged with coarsely granulated silica gel, for instance of a granular size of between 0.1 mm. and 2 mm. When the solution to be purified is passed into the column, the fission products are gradually filling the pores of the silica gel granules, while the complexed uranium and plutonium molecules, which cannot enter the pores, pass unhindered through the molecular sieve and are removed for further treatment. When the molecular sieve is saturated with fission products, it is disconnected and replaced by a new one, while the saturated silica gel is removed for storing or further treatment.

By the process of the invention, the complexed actinides may also be separated from the fission products by electrodialysis. Cathode and anode are separated by a microporous diaphragm having a pore diameter equal to 6 to 12 A.

The initial solution is introduced into the anode space in such a manner that the fission products migrate into the cathode space due to their positive charge.

According to the invention, a micro-porous diaphragm for the purpose specified, may advantageously be prepared from sintered titanium powder or porous polyethylene.

In case the complexing of uranium and plutonium is carried so far that neutral complexes are formed, a standard diaphragm may be used.

In case the complexing agent contains anion groups, even negatively charged complexes may be obtained, which may be enriched in the anode space.

I claim:

1. A process for the separation of fission products taken from the group consisting of elements having atomic numbers between 30 and 64 and having ion diameters between 1.4 A. and 2.0 A. from uranium and plutonium; said process comprising admixing an acid aqueous uranyl nitrate solution containing dissolved neutron-irradiated uranium with a complexing agent; said complexing agent containing polar atom groups, and being capable of selectively forming uranium molecular complexes of the type $$UO_2(NO_3)_n \cdot L_m$$

and plutonium molecular complexes of the type $$Pu(NO_3)_p \cdot L_q$$

in which L is the complexing agent, $n$, $m$ and $q$ are integers taken from the group consisting of 1 and 2 and $p$ is an integer taken from the group consisting of 1, 2, 3 and 4, and being taken from the group consisting of diol compounds, triol compounds, nitrogenous derivatives taken from the group consisting of hydroxylamine, carbamide, triethanolamine and nitrilotriacetic acid, and ketone derivatives of the type $$O=C\begin{smallmatrix}R_1\\R_2\end{smallmatrix}$$

in which $R_1$ and $R_2$ denote oxygenated hydrocarbon chains; said polar atom groups being taken from the group consisting of hydroxy, ether, ester, keto and carboxy groups; and contacting the resulting aqueous mixture containing said fission products in an uncomplexed state and the molecules of said uranium and plutonium in a complexed state with a molecular sieve having passages the diameters of which are greater than 25 A. and blind pores the diameters of which are between 6 A. and 12 A.; whereby the complexed uranium and plutonium molecules pass through said passages and said uncomplexed fission products enter and are retained in said blind pores.

2. A process as claimed in claim 1, wherein said complexing agent is ethylene glycol.

3. A process as claimed in claim 1, wherein said complexing agent is 1,3-propane diol.

4. A process as claimed in claim 1, wherein said complexing agent is 1,4-butane diol.

5. A process as claimed in claim 1, wherein said complexing agent is a derivative of hydroxyl amine.

6. A process as claimed in claim 1, wherein said complexing agent is a derivative of nitrilo tri-acetic acid.

7. A process as claimed in claim 1 wherein said complexing agent is a polyethylene glycol of the type $$HOCH_2(CH_2OCH_2)_n \cdot CH_2OH$$

8. A process for the separation of impurities taken from the group consisting of elements having ion diameters between 1.4 A. and 2.0 A. from actinides taken from the group consisting of uranium and plutonium; said process comprising admixing an acid aqueous uranyl nitrate solution containing said impurities and actinides with a complexing agent; said complexing agent containing polar atom groups, and being capable of selectively forming uranium molecular complexes of the type $$UO_2(NO_3)_n \cdot L_m$$

and plutonium molecular complexes of the type $$Pu(NO_3)_p \cdot L_q$$

in which L is the complexing agent, $n$, $m$ and $q$ are integers taken from the group consisting of 1 and 2 and $p$ is an integer taken from the group consisting of 1, 2, 3 and 4, and being taken from the group consisting of diol compounds, triol compounds, nitrogenous derivatives taken from the group consisting of hydroxylamine, carbamide, triethanolamine and nitrilotriacetic acid, and ketone derivatives of the type $$O=C\begin{matrix}R_1\\R_2\end{matrix}$$

in which $R_1$ and $R_2$ denote oxygenated hydrocarbon chains; said polar atom groups being taken from the group consisting of hydroxy, ether, ester, keto and carboxy groups; and contacting the resulting aqueous mixture containing said impurities in an uncomplexed state and complexed actinides with a molecular sieve having passages the diameters of which are greater than 25 A. and blind pores the diameters of which are between ½ the average diameter of said complexed molecules and 3 to 4 times the maximum diameter of said uncomplexed impurities; whereby said complexed actinide molecules pass through said passages and said uncomplexed impurities enter and are retained in said blind pores.

9. The process as claimed in claim 8 wherein said molecular sieve is produced by the slow polymerization of orthosilic acid at a pH of 2, said molecular sieve consisting of granules defining said passages, said granules containing said blind pores therein.

References Cited by the Examiner

UNITED STATES PATENTS

| | | | |
|---|---|---|---|
| 2,566,308 | 9/1951 | Brewer | 204—180 |
| 2,717,696 | 9/1955 | Schubert | 210—41 |
| 2,733,200 | 1/1956 | Kunin | 204—1.5 |
| 2,796,424 | 6/1957 | Schulz et al. | 260—429 |
| 2,893,824 | 7/1959 | Hyman et al. | 23—14.5 |
| 2,989,367 | 6/1961 | Thompson et al. | |
| 2,989,556 | 6/1961 | Dixon et al. | |
| 3,042,597 | 7/1962 | Schumacher | 204—180 |

REUBEN EPSTEIN, *Primary Examiner.*